(12) United States Patent
Bauman

(10) Patent No.: US 9,290,046 B2
(45) Date of Patent: Mar. 22, 2016

(54) LOW EFFICIENCY BICYCLE WHEEL SYSTEM AND METHOD

(71) Applicant: CADABEKY LLC, Grafton, WI (US)

(72) Inventor: Carl Bauman, Grafton, WI (US)

(73) Assignee: CADABEKY LLC, Grafton, WI (US)

( * ) Notice: Subject to any disclaimer, the term of this patent is extended or adjusted under 35 U.S.C. 154(b) by 0 days.

(21) Appl. No.: 14/586,185

(22) Filed: Dec. 30, 2014

(65) Prior Publication Data

US 2015/0183267 A1 Jul. 2, 2015

Related U.S. Application Data

(60) Provisional application No. 61/922,303, filed on Dec. 31, 2013.

(51) Int. Cl.
*B60B 19/00* (2006.01)
*A63B 69/16* (2006.01)

(52) U.S. Cl.
CPC ............. *B60B 19/00* (2013.01); *A63B 69/16* (2013.01); *A63B 2069/168* (2013.01); *B60Y 2200/13* (2013.01)

(58) Field of Classification Search
CPC ... B60B 19/00; A63B 69/16; A63B 2069/168
USPC .............................................. 301/6.1, 6.5, 6.9
See application file for complete search history.

(56) References Cited

U.S. PATENT DOCUMENTS 5,743,544 A * 4/1998 Weaver .................... A61G 5/02
188/2 F
2013/0082512 A1* 4/2013 Daigle ................... A61G 5/023
301/6.5

* cited by examiner

*Primary Examiner* — John Walters
(74) *Attorney, Agent, or Firm* — Ryan Kromholz & Manion, S.C.

(57) ABSTRACT

A low efficiency wheel system and method, the system includes an inner, propelled wheel and an outer wheel circumferentially adjacent the inner wheel. The system includes an efficiency reduction apparatus located between the inner wheel outer circumferential surface and the outer wheel inner circumferential edge to reduce the efficiency of the inner wheel as it transfers motion to the outer wheel. Such efficiency reduction apparatus may include a reducing drive roller assembly, reducing drive gear assembly, bearing assemblies, raceway restrictions, or combinations thereof.

15 Claims, 15 Drawing Sheets

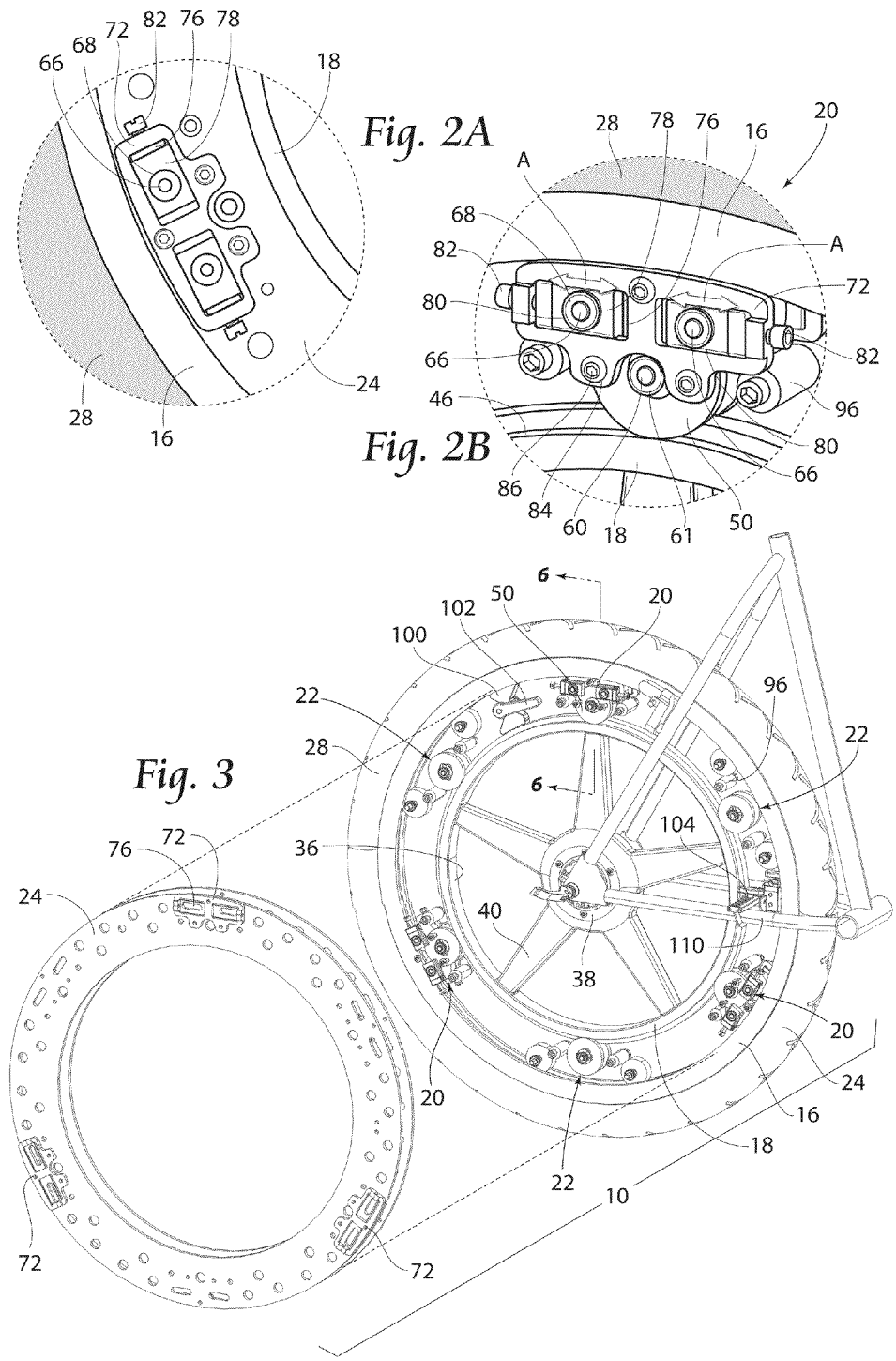

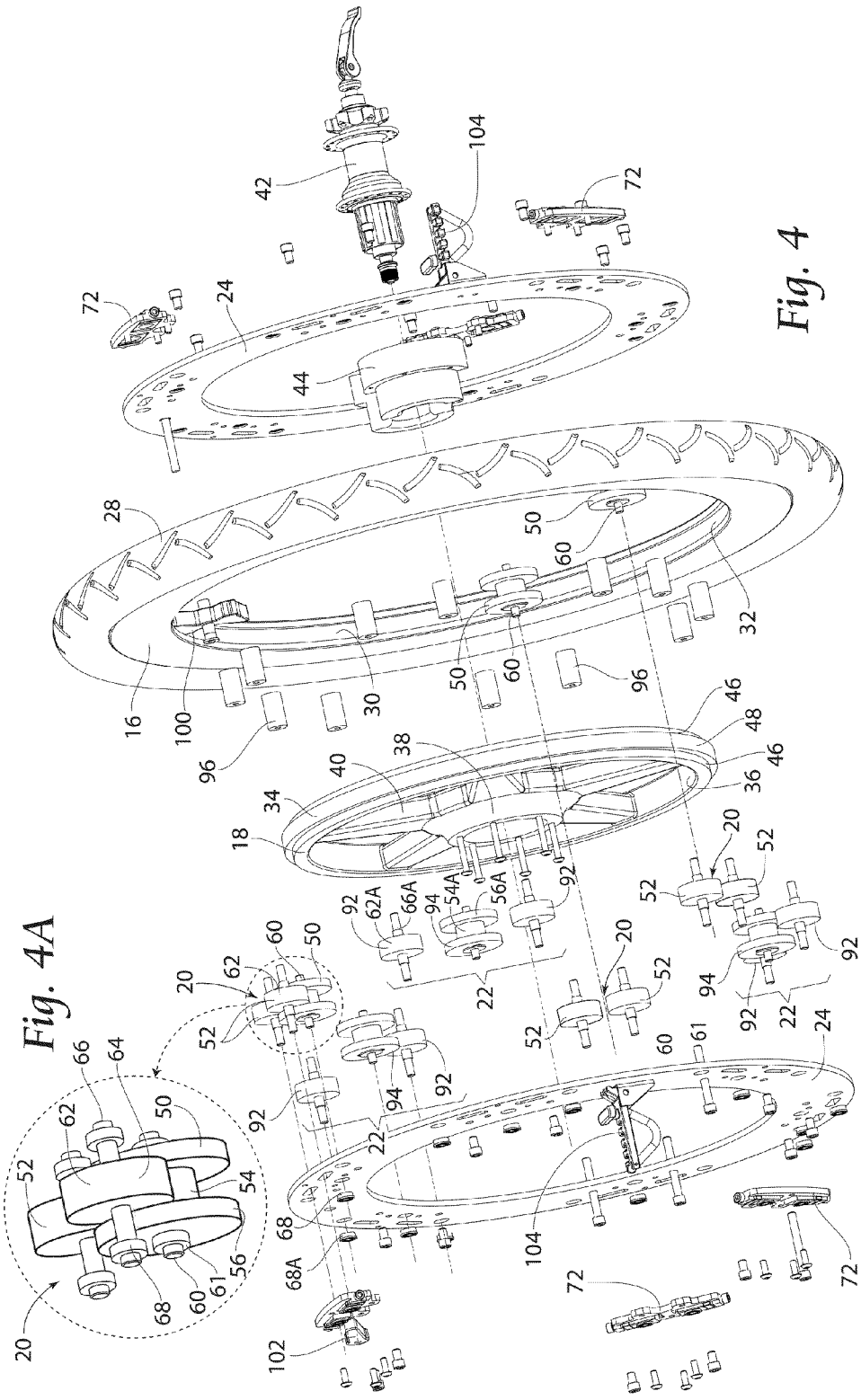

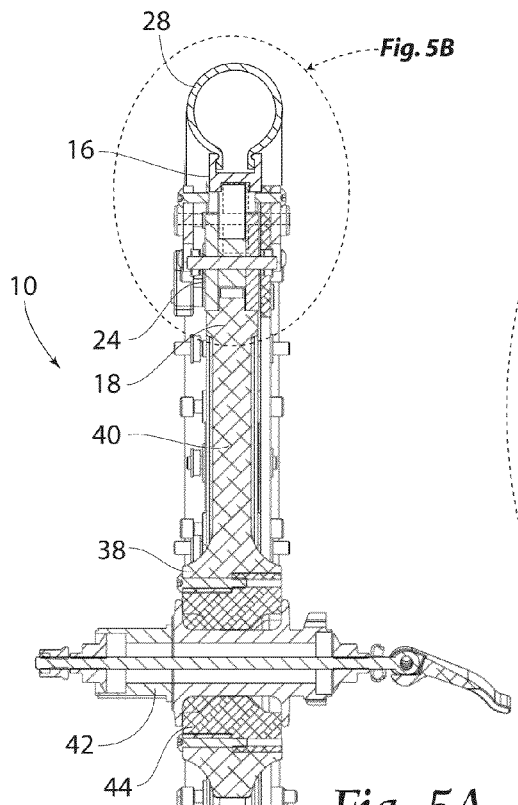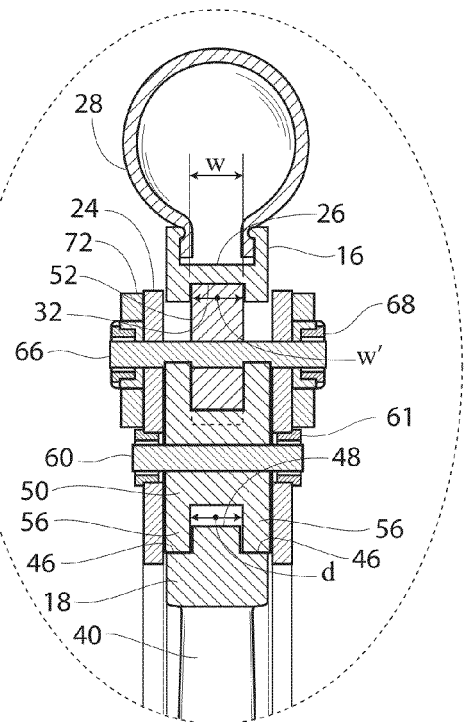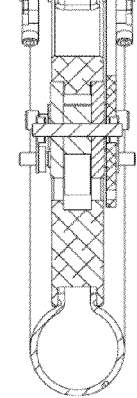
Fig. 5A
Fig. 5B
Fig. 5C

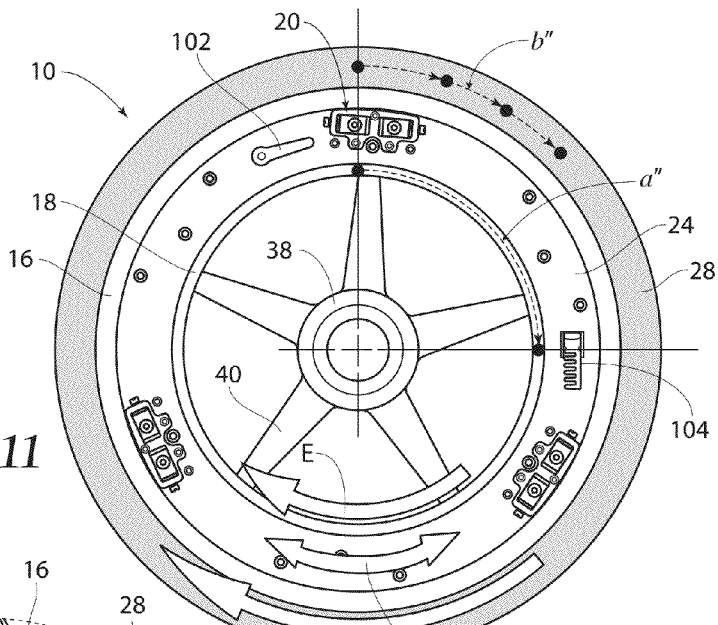
Fig. 11
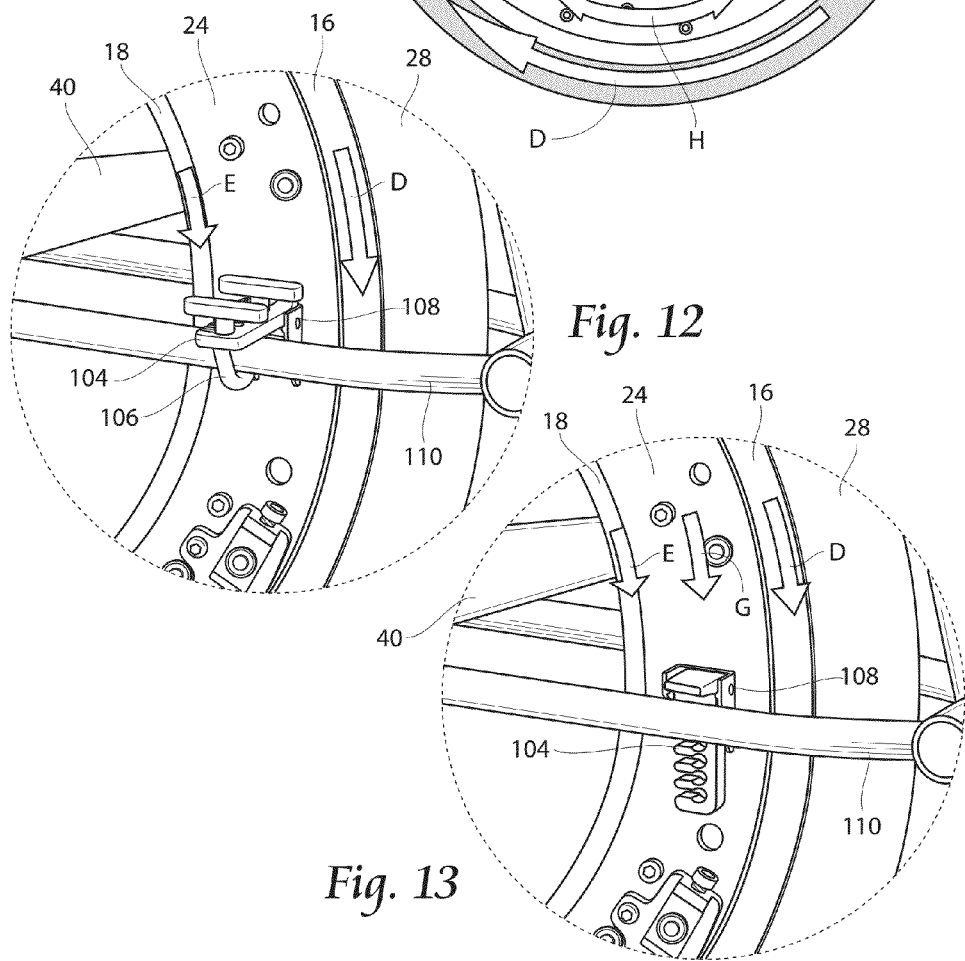
Fig. 12
Fig. 13

LOW EFFICIENCY BICYCLE WHEEL SYSTEM AND METHOD

RELATED APPLICATIONS

This application claims the benefit of U.S. Provisional Patent Application Ser. No. 61/922,303, filed on 31 Dec. 2013, and titled "Low Efficiency Bicycle Wheel."

BACKGROUND OF THE INVENTION

Cycling is a popular pastime and is commonly enjoyed for exercise, recreation and sport. Often a cyclist will seek the most efficient use of physical effort to achieve distance travelled. Alternatively, when cycling for exercise, a cyclist may seek to vary effort exerted, including use of maximal effort, over a preset duration or in training directed intervals. Training in this way allows the cyclist to meet an individual training goal and allows the cyclist to work at a target rate of exertion to build endurance and to achieve other training goals. Often this means that a cyclist seeks to pedal at a constant rate while varying the work required, either through use of variable terrain, gears, or a combination of both. However when cycling with slower cyclists, such as children, or when cycling with walking companions or with a pet, the cyclist is faced with abandoning his training goal, or otherwise being unable to maintain a slow enough speed to match the pace of the companion. Other circumstances in which a cyclist may wish to maintain a slow pace while pedaling at a high speed may include while training indoors in a restricted area during inclement weather.

SUMMARY OF THE INVENTION

The present invention seeks to solve the mentioned problem by providing a reduced efficiency wheel system that allows the cyclist to pedal at a greater rate while the bicycle is propelled at slower speed. This allows the cyclist to maintain a steady and effort filled pedal rate while the cycle moves slowly along the ground. A system according to the present invention includes an inner, propelled wheel and an outer wheel circumferentially adjacent to the inner wheel. The system includes efficiency reduction apparatus to reduce the efficiency of the inner wheel as it transfers motion to the outer wheel. Such apparatus may include a reducing drive roller assembly, reducing drive gear assembly, bearing assemblies, raceway restrictions, or combinations thereof, as will be discussed.

The present invention is directed to a low efficiency wheel system including an inner wheel, the inner wheel having an inner circumferential surface and an outer circumferential surface, wherein the inner wheel is a driven wheel; an outer wheel, the outer wheel having an inner circumferential edge and an outer circumferential edge, wherein the inner circumferential edge is circumferentially adjacent to the outer circumferential surface of the inner wheel; and an efficiency reduction apparatus located between the outer circumferential surface of the inner wheel and the inner circumferential edge of the outer wheel. The present invention may further include an efficiency reduction apparatus having at least one reducing drive roller assembly, at least one idler roller assembly and at least one roller carrier; the reducing drive roller assembly having at least one transfer roller and at least one reducing drive roller, and wherein the at least one reducing drive roller includes a central cylinder member having a first diameter and a pair of axially spaced apart circular bearing members having a second diameter, wherein the second diameter is larger than the first diameter. The present invention may further include a raceway formed in the inner circumferential edge and a pair of circumferential, laterally spaced bearing tracks having an upraised central portion there between formed on the outer circumferential surface of the inner wheel, the pair of axially spaced apart circular bearing members being arranged for bearing contact with the bearing tracks and the at least one transfer roller being arranged for rolling engagement with the raceway.

The present invention is further directed to a method of reducing wheel efficiency including the steps of: providing an inner wheel, having an inner circumferential surface and an outer circumferential surface, and wherein the inner wheel is a driven wheel; providing an outer wheel, having an inner circumferential edge and an outer circumferential edge, and wherein the inner circumferential edge is circumferentially adjacent the outer circumferential surface of the inner wheel; and providing an efficiency reduction apparatus located between the outer circumferential surface of the inner wheel and the inner circumferential edge of the outer wheel. The method may include the further steps of moving the inner wheel a first tangential distance; inputting the first tangential distance from the inner wheel to the efficiency reduction apparatus; outputting a second tangential distance from the efficiency reduction apparatus to the outer wheel; and moving the outer wheel the second tangential distance, wherein the second tangential distance is less than the first tangential distance.

BRIEF DESCRIPTION OF THE DRAWINGS

FIG. 2A is an enlarged view of the drive roller assembly shown in FIG. 2 in area 2A and showing a roller carrier in place.

FIG. 2B is an enlarged view of the drive roller assembly shown in FIG. 2 in area 2B and showing a roller carrier removed.

FIG. 3 is a partially exploded view of the system illustrated in FIGS. 1-2B.

FIG. 4 is an exploded view of the low efficiency wheel system illustrated in FIGS. 1-3.

FIG. 4A is an enlarged view of the drive roller assembly shown in FIG. 4.

FIG. 5A is a cross sectional view of the system illustrated in FIG. 2 and taken along lines 5A-5A thereof.

FIG. 5B is an enlarged cross sectional view of a drive roller assembly seen generally in area 5B of FIG. 5A.

FIG. 5C is a view showing a cage assembly with adjustment means and inflator valve, with drive roller assembly in phantom.

FIG. 11 is a view similar to that of FIGS. 9 and 10 showing relative motion of the inner wheel, outer wheel, and roller carrier, with the wheel lock assembly disengaged and the frame lock assembly disengaged.

FIG. 12 is fragmentary enlarged view showing a frame lock assembly in a locked position.

FIG. 13 is a view similar to that of FIG. 12 but showing a frame lock assembly in an unlocked, stowed position.

DESCRIPTION OF THE PREFERRED EMBODIMENT

Figure 1:
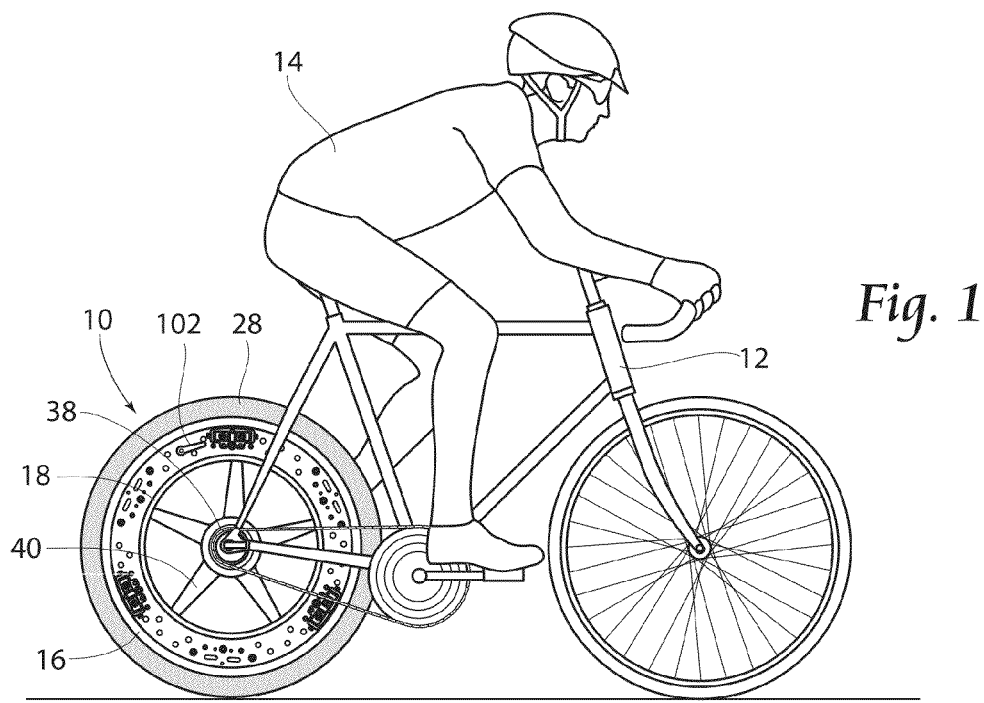
FIG. 1 is a side view of a rider and bicycle with the bicycle including a low efficiency wheel system of the present invention.
Figure 2:
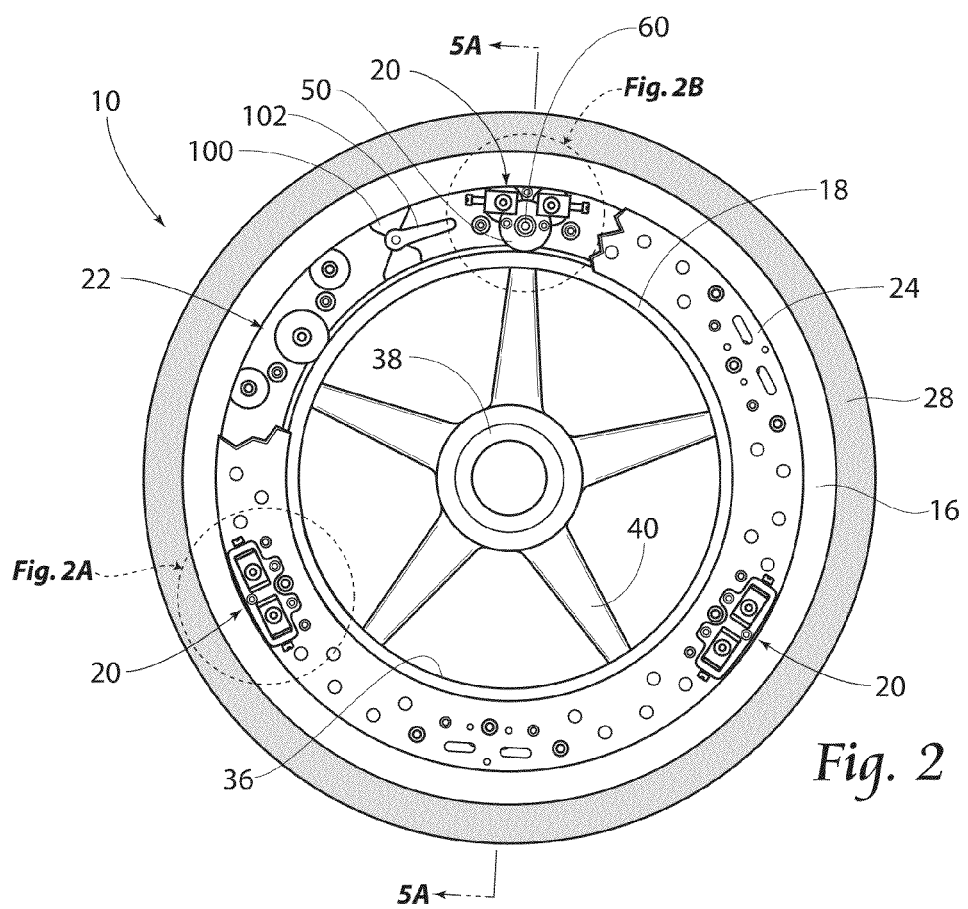
FIG. 2 is a partially cut away view of a bicycle wheel including a low efficiency system according to the present invention.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention which is defined by the claims.

The present invention is directed to a low efficiency wheel system and method for use on a bicycle. The system enables the cyclist to pedal at a high rate while propelling the bicycle at a greatly reduced speed. Moreover, the system allows the cyclist to maintain a steady and effort-filled pedal rate while the bicycle moves slowly along the ground.

With attention to FIGS. 1-5C, the present invention may be seen as a system 10 devised to greatly reduce the propulsion efficiency of a wheel, particularly that of a bicycle 12. The system 10 enables a cyclist 14 to pedal with high energy yet move slowly over the ground. As is shown, a system 10 according to the present invention preferably includes an outer wheel 16, an inner wheel 18, and an efficiency reduction apparatus having at least one drive roller assembly 20, at least one idler roller assembly 22 and at least one roller carrier 24. The outer wheel 16 includes an outer circumferential edge 26 which is adapted to engage a standard bicycle tire 28 for contact with the ground during use. The outer wheel 16 further includes an inner circumferential edge 30 having a raceway 32 formed therein.

Seen particularly in FIGS. 2, 3, 4, and 6, the system 10 includes an inner wheel 18. As is shown, the inner wheel 18 includes an outer circumferential surface 34 and an inner circumferential surface 36. As is illustrated, the inner wheel 18 includes a hub 38 having radially extending spokes 40 which terminate at, and are connected to, the inner circumferential surface 36. While the Figures illustrate the inner wheel 18 as having five spokes 40, it is to be understood that the inner wheel 18 may have any number of spokes 40, including zero, if a solid disk (not shown) is used. The hub 38 is adapted to receive a standard multi-speed hub and sprocket assembly 42, which is secured by way of a hub carrier 44 (see FIG. 4). As is further seen, the outer circumferential surface 34 includes a pair of circumferential, laterally spaced bearing tracks 46 having an upraised central portion 48 therebetween. As will be discussed, the configuration of bearing tracks 46 with central portion 48 is adapted to support reducing drive rollers 50.

Figure 6:
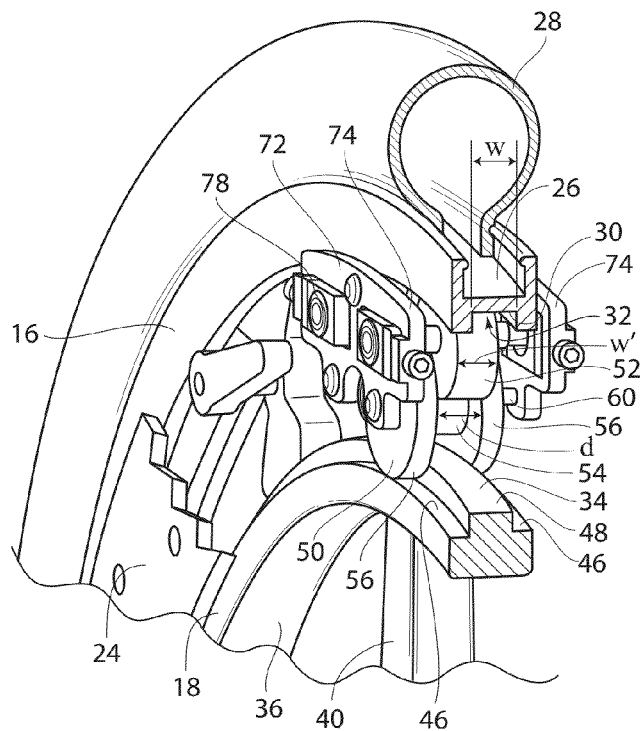
FIG. 6 is a fragmentary section view showing a drive roller assembly and wheel lock assembly.

With particular attention now to FIGS. 4 and 6, a reducing drive roller assembly 20 for use with the present system 10 may be seen. As illustrated, the reducing roller assembly 20 includes at least one transfer roller 52 and at least one reducing drive roller 50. The reducing drive roller 50 is preferably of a generally spool shape, having a central cylinder member 54 having a first diameter D1 (and therefore a first radius R1, not shown), and a pair of axially spaced apart circular bearing members 56 having a second diameter D2 (and a second radius R2, not shown). The diameter D2 of the bearing members 56 is preferably larger than that of the central cylinder 54. The ratio between D1 and D2 is directly proportional to the tangential distances traveled by the outer wheel 16 with respect to the tangential distance traveled by the inner wheel 18 during use, as will be discussed. The central cylinder 54 and bearing members 56 each are supported on an axle 60 supported by bearing 61. As is further seen in FIG. 5B, in use, the reducing drive roller 50 straddles the outer circumferential surface 34 of the inner wheel 18. With further attention to FIG. 5B, the bearing members 56 are spaced apart a distance d sufficient to allow the reducing drive roller 50 to rotate with the bearing members 56 in contact with the bearing tracks 46.

Figure 14:
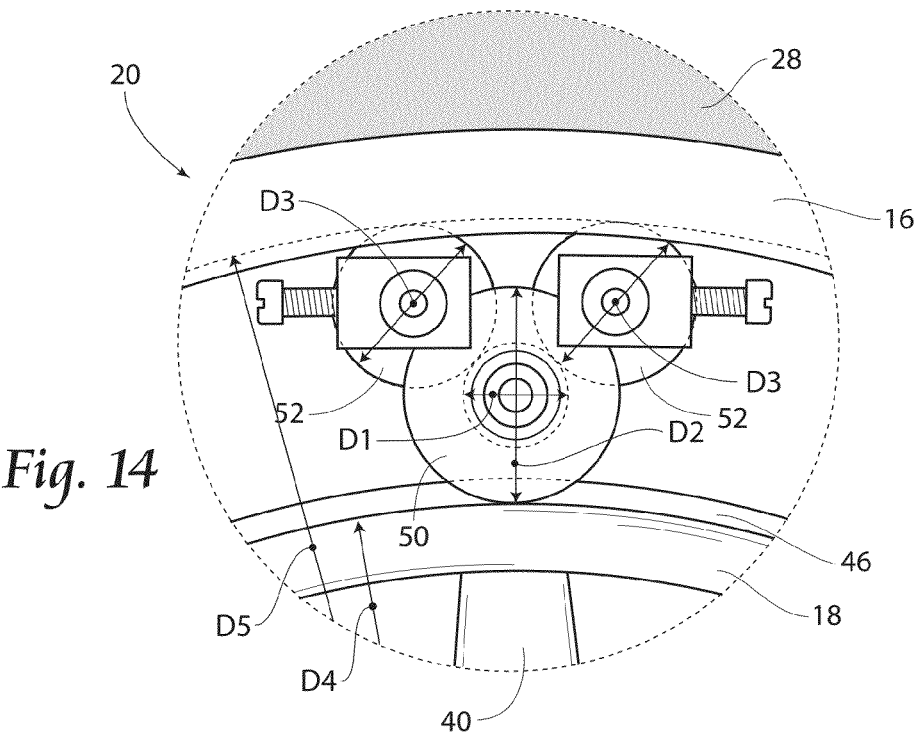
FIG. 14 is a side view of a drive roller assembly for use with the present system and showing relative diameters of the component parts.

As previously mentioned, the reducing drive roller assembly 20 further includes at least one transfer roller 52. As shown particularly in FIG. 4A, a transfer roller 52 for use with the drive roller assembly 20 preferably includes a roller member 62 having a generally circular outer surface 64, and an axle member 66 supported on a bearing 68. The outer surface 64 is of a predetermined width w (see FIG. 5B) to permit the roller member 62 to ride between the bearing tracks 46 and be rollingly supported on the central cylinder 54. Moreover, the raceway 32 of the outer wheel 16 is of a predetermined width w' sufficient to permit the roller member 62 to be supported and roll therein. The transfer roller 52 has a third diameter D3 (and a third radius R3, not shown). The interaction of the central cylinder member 54, the pair of axially spaced apart circular bearing members 56, and the transfer roller 52, having respective diameters D1, D2, and D3, may be viewed in FIG. 14 along with the inner wheel 18 having a diameter D4 and the outer wheel 16 having a diameter D5.

As mentioned earlier, the tangential distance traveled by the outer wheel 16 with respect to the inner wheel 18 is directly proportional to the ratio between the first diameter D1 of the drive roller central cylinder member 54 and the second diameter D2 of the drive roller circular bearing members 56.

Tangential distance, represented by the letter S in the equations employed herein, is the distance traveled around the periphery of a circle and is the product of the radius R of the circle and the angular distance θ rotated: S=R*θ. Three common ways to measure angular distance θ are with revolutions, degrees, and radians. For example, one complete revolution around the circle would be equal to 360 degrees or 2π radians.

Provided this equation, the relationships of the elements of the system 10 may be calculated as follows, wherein the subscript numbers correspond to the numbering system used with regard to the diameters discussed above (e.g., S4 designates the tangential distance of the inner wheel 18 having diameter D4):

$$S_4 = R_4 \theta_4; \theta_4 = \frac{S_4}{R_4}$$

$$S_2 = R_2 \theta_2; \theta_2 = \frac{S_2}{R_2}$$

The inner wheel tangential distance $S_4$ will be the same as the drive roller circular bearing member tangential distance $S_2$ because they make contact with and travel along each other's periphery, therefore $S_2 = S_4$.

$$S_1 = R_1 \theta_1; \theta_1 = \frac{S_1}{R_1}$$

$$S_3 = R_3 \theta_3; \theta_3 = \frac{S_3}{R_3}$$

$$S_5 = R_5 \theta_5; \theta_5 = \frac{S_5}{R_5}$$

Similarly, the central cylinder member 54 tangential distance $S_1$ traveled at any time will be equal to the tangential distance $S_3$ traveled by the transfer roller 52 and the tangential distance $S_5$ traveled by the outer wheel 16 because they make contact and travel along each other's peripheries, therefore: $S_1 = S_3 = S_5$ Further, because the reducing drive roller 50 circular bearing members 56 are affixed in rotation with the drive roller central cylinder member 54, any rotation experienced by one will be experienced by the other, therefore: $\theta_1 = \theta_2$.

Given these relationships we can solve for the tangential distance $S_5$ traveled by the outer wheel 16 with respect to the tangential distance $S_4$ traveled by the inner wheel 18 in light of the ratio between the drive roller central cylinder member 54 radius $R_1$ and the reducing drive roller 50 circular bearing member 56 radius $R_2$:

$$\theta_2 = \frac{S_2}{R_2} \rightarrow \theta_2 = \frac{S_4}{R_2}; \text{ because } S_2 = S_4$$

$$\theta_1 = \frac{S_1}{R_1} \rightarrow \theta_1 = \frac{S_5}{R_1}; \text{ because } S_1 = S_5$$

Therefore:

$$\frac{S_4}{R_2} = \frac{S_5}{R_1}; \text{ because } \theta_2 = \theta_1$$

Solving for $S_5$ provides:

$$S_5 = \left(\frac{R_1}{R_2}\right) S_4$$

Therefore, the ratio of $R_1$ to $R_2$ is 1:2, the tangential distance $S_5$ traveled by the outer wheel 16 will be equal to half the tangential distance $S_4$ traveled by the inner wheel 18.

$$S_5 = \left(\frac{1}{2}\right) * S_4$$

If the inner wheel 18 completes one revolution (i.e., 360 degrees, 2π radians, or the complete circumference) and if $R_1=0.5$ in; $R_2=1$ in; $R_4=9.5$ in; $\theta_4=360°$; and $R_5=13.5$ in, we can solve for $S_5$ and also for the angular distance $\theta_5$.

First, the tangential distance $S_5$ of the outer wheel 16:

For example, if the circumference of the inner wheel 18 is: $2\pi(9.5 \text{ in}) = 59.69 \text{ in} = S_4$ $$S_5 = \left(\frac{R_1}{R_2}\right) S_4$$

$$S_5 = \left(\frac{0.5}{1}\right) 59.69 in$$

$$S_5 = 29.85 in$$

Second, the angular distance $\theta_5$ of the outer wheel 16:

$$S_5 = \left(\frac{R_1}{R_2}\right) S_4 \rightarrow R_5 \theta_5 = \left(\frac{R_1}{R_2}\right) S_4; \text{ because } S_5 = R_5 \theta_5$$

$$\theta_5 = \frac{\left(\frac{R_1}{R_2}\right) S_4}{R_5}$$

$$\theta_5 = \frac{\left(\frac{0.5}{1}\right) * 59.69 in}{13.5 in}$$

$$\theta_5 = 2.21 \text{ radians}$$

Dividing $\theta_5$ by 2π will provide the percentage of angular distance experienced by the outer wheel 16 with respect to that experienced by the inner wheel 18:

$$\frac{2.21 \text{ radians}}{2\pi} = 0.35 = 35\%.$$

Further, when this percent value is multiplied by the full 360° (i.e., the angular distance $\theta_4$ experienced by the inner wheel 18) the angular distance $\theta_5$ of the outer wheel 16 is shown to be only 126.7°. Therefore, although the tangential distance $S_5$ transferred to the outer wheel 16 is half the tangential distance $S_4$ traveled by the inner wheel 18, the angular distance $\theta_5$ experienced by the outer wheel 16 is further reduced by the ratio of the inner wheel radius $R_4$ and the outer wheel radius $R_5$:

$$\theta_5 = \frac{\left(\frac{R_1}{R_2}\right)S_4}{R_5} \rightarrow \theta_5 = \frac{\left(\frac{R_1}{R_2}\right)R_4\theta_4}{R_5}; \text{ because } S_4 = R_4\theta_4$$

A preferred drive roller assembly 20 includes a reducing drive roller 50 and a pair of transfer rollers 52, although it is to be understood that other combinations may be used. Moreover, the various roller members 50, 52 described herein may be of any suitably durable and resilient material such as plastic, rubber, steel or the like, having an approximate durometer hardness greater than 70.

With particular attention to FIGS. 2B, 4, 5, and 8, a drive roller assembly 20 according to the present invention may further include an assembly cage 72 to retain the various components 50, 52 of the drive roller assembly 20 in operational position and to secure the drive roller assembly 20 to the inner and outer roller carriers 24. As viewed, the assembly cage 72 preferably includes a pair of spaced cage members 74 which are laterally spaced with the drive roller assembly 20 therebetween. The cage members 74 are each provided with plurality of adjustment block apertures 76 which are adapted to receive adjustment blocks 78 (see FIG. 2B). The adjustment blocks 78 each further include a bearing aperture 80 into which a bearing 68 and axle 66 of a respective transfer roller 52 rotates. The adjustment blocks 78 each include an adjustment mechanism 82 which serves to move the adjustment block 78 in the direction of arrows A (see FIGS. 2B and 8) to thereby provide pressure to and urge the transfer rollers 52 into contact with the reducing drive roller 50. The assembly cage 72 further includes means for attachment to the roller carriers 24 such as the aperture 84 and bolt 86 combination shown. As is illustrated in the view of FIG. 5C, the present system 10 may include a standard inflator 112 for use in inflating the tire 28 affixed to the outer wheel 16.

Figure 7:
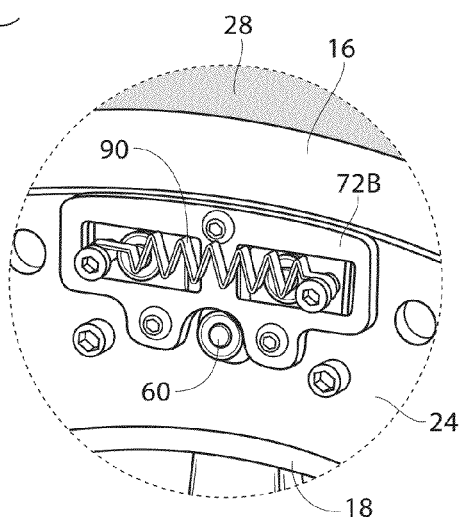
FIG. 7 is a view of an alternative cage assembly and adjustment means for use in the present system.
Figure 8:
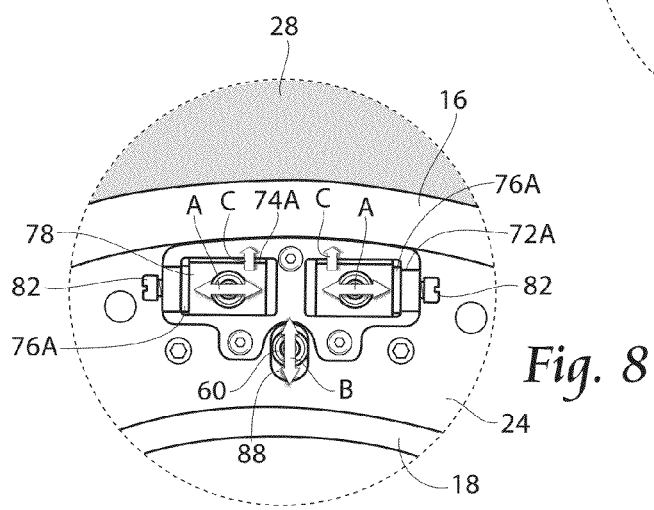
FIG. 8 is a view of another embodiment cage assembly and adjustment means for use in the present system.

FIG. 8 illustrates an alternative assembly cage 72A and adjustment block 78 arrangement. As viewed, each cage member 74A includes adjustment block apertures 76A having a size slightly larger than the adjustment blocks 78. Moreover, the roller carriers 24 include an oval aperture 88 to support the reducing drive roller 50 axle 60 therein. The combination of larger block aperture 76A and oval aperture 88 allows the drive roller assembly 20 additional adjustments. For example, as the adjustment mechanism 82 is manipulated to move the adjustment blocks 78 in the direction of arrows A, the drive roller 50 is also moved in the direction of arrow B, and the transfer rollers 52 are moved in the direction of arrows C. When the adjustment blocks 78 are moved towards each other along the direction of arrows A, the transfer rollers 52 are forced into a more engaged contact with the inner circumferential edge 30 of the outer wheel 16 and the drive roller 50 into a more engaged contact with the inner wheel 18, thus reducing slippage, if desired. Although an adjustment block 78 is shown in most views, other adjustment means may be used with the present system 10, such as the assembly cage 72B and spring 90 illustrated in FIG. 7.

With particular attention now to FIG. 4, a system 10 according to the present invention may be seen to further include at least one idler roller assembly 22. As viewed, the idler roller assemblies 22 each preferably include an outer passive idler roller 92 and an inner passive idler roller 94. The outer passive idler rollers 92 are of a similar design to that of the previously described transfer roller 52 and include a roller member 62A and an axle 66A supported on a bearing 68A. Moreover, the inner passive idler roller 94 is similar to that of the described reducing drive roller 50, and is of a generally spool shape, having a central cylinder 54A. As in the previously described drive roller 50, the inner passive idler roller 94 also includes pair of axially spaced apart circular bearing members 56A wherein the relative diameter of the central cylinder 54A is smaller than that of the bearing members 56A. Moreover, similar to that of the drive roller assembly 20, the various roller members 92, 94 described as a part of the idler roller assembly 22 may be of any suitably durable and resilient material such as plastic, rubber, steel or the like, having an approximate durometer hardness greater than 70. The central cylinder 54A includes an axle 60 supported on a bearing 61. Unlike the drive roller assembly 20, the idler roller assembly 22 is not restrained by an assembly cage 72 to maintain frictional contact between the respective components, rather the idler roller assembly 22 serves to maintain uniform spacing between the outer wheel 16 and the inner wheel 18 during use. Spacer members 96 are used to ensure proper separation between the inner and outer roller carriers 24.

Figure 9:
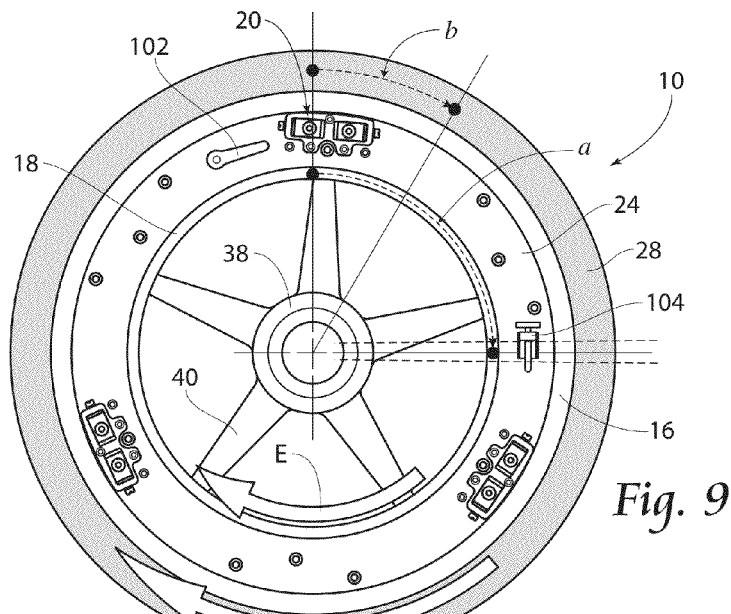
FIG. 9 is a view similar to that of FIG. 2 and showing relative motion of the inner wheel and outer wheel with the wheel rotation lock assembly disengaged and a frame lock assembly engaged.
Figure 10:
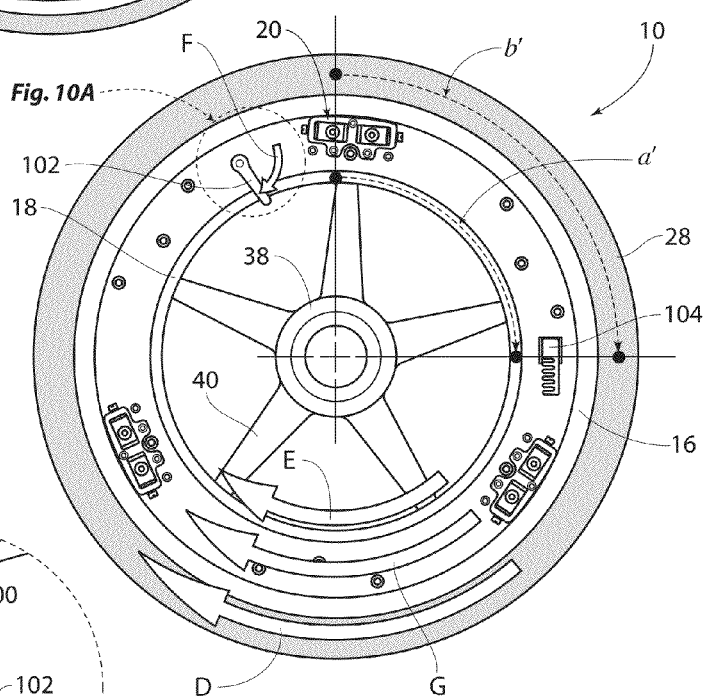
FIG. 10 is a view similar to that of FIG. 9 but showing relative motion of the inner wheel and outer wheel with the wheel lock assembly engaged and the frame lock assembly disengaged.
Figure 10A:
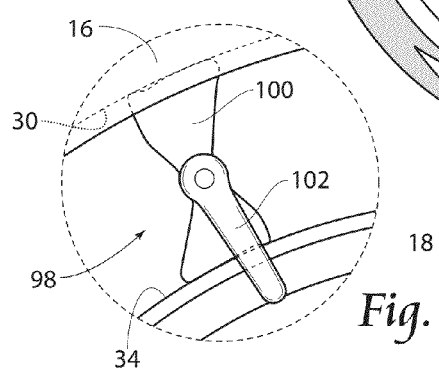
FIG. 10A is an enlarged view of the wheel lock assembly shown in FIG. 10 as area 10A but with the roller carrier removed.
Figure 15:
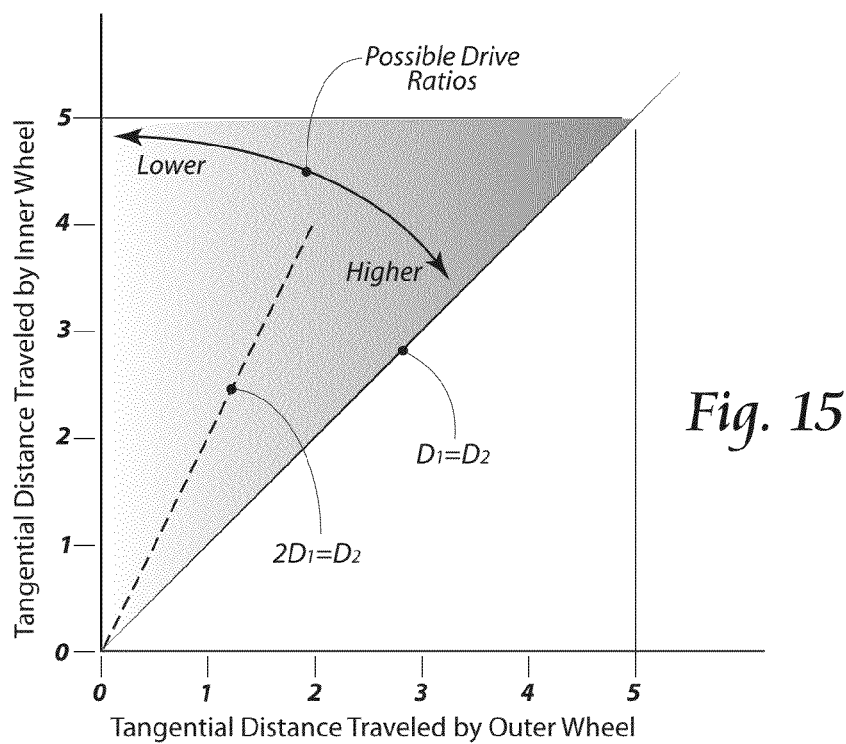
FIG. 15 is a graphic representation showing possible tangential distance traveled ratios.

With attention now to FIGS. 9-10A, a system 10 according to the present invention may be seen to include a wheel rotation lock assembly 98 having a lock cam member 100 and a lock lever member 102 (see FIG. 10A). The wheel rotation lock assembly 98 serves to selectively couple or uncouple the outer wheel 16 from the inner wheel 18 to permit operation in either a low efficiency mode or standard mode. The view of FIG. 9 illustrates the lock assembly 98 in an unlocked position, in which the system 10 is operating in a low efficiency mode. As seen, the outer wheel 16 moves in the direction of arrow D and the inner wheel rotates in the direction of arrow E. The roller carrier 24 does not rotate due to a frame stop assembly 104, as will be discussed. Since the wheels 16, 18 are not locked together, the ratio of the outer wheel tangential distance (here designated as b) to the inner wheel tangential distance (here designated as a) is proportional to the ratio of the first diameter D1 of the central cylinder member 54 (FIG. 14) to the second diameter D2 of the pair of axially spaced apart circular bearing members 56 (FIG. 14), as shown by the calculations provided above and graphically illustrated in FIG. 15. As depicted in FIG. 9, the ratio of D1:D2 is 1:2; therefore, the outer wheel tangential distance b is half of the inner wheel tangential distance a.

If a user wishes to ride the bicycle 12 in standard mode, the lock lever member 102 is moved in the direction of arrow F (see FIG. 10), to position the lock cam member 100 against the inner circumferential edge 30 of the outer wheel 16 and the outer circumferential surface 34 of the inner wheel 18 (see FIG. 10A). With the lock assembly 98 in the locked position, the wheels 16, 18, rotate in the directions of arrows D and E and the roller carrier 24 rotates in the direction of arrow G in concert with the wheels 16, 18. Thus, the drive roller assembly 20 is effectively removed from the system 10 making the relationship between tangential distance a' of the inner wheel

18 and the tangential distance b' of the outer wheel 16 proportional to the ratio of the inner wheel 18 diameter D4 to the diameter D5 of the outer wheel 16, and their respective angular distances rotated are the same (here shown as 900).

FIGS. 9-13 further illustrate a frame stop assembly 104. The frame stop assembly 104 includes a frame stop fastener member 106 and a brace member 108 for securing the frame stop assembly 104 to a roller carrier 24. The frame stop fastener member 106 is adapted to be secured to a bicycle frame 110 to thereby stop rotational movement of the roller carrier 24 (see FIGS. 9 and 12) when the system 10 is used in the low efficiency mode. When it is desired to ride the bicycle 12 under usual operational conditions, the frame stop fastener member 106 is unfastened (see FIG. 13), the wheel rotation lock assembly 98 is engaged (see FIG. 10), and the user may operate the bicycle 12 in a standard manner. It is to be understood that while the drawings include a frame stop assembly 104, use of the present system 10 does not require it. FIG. 11, for example, illustrates a bicycle 12 using a low efficiency system 10 according to the present invention, with the frame stop assembly 104 uncoupled. When a system 10 is used with the frame stop assembly 104 disengaged, low efficiency is achieved even as the roller carrier 24 may move in the direction of arrow H. Used in this manner, and since the wheels 16, 18 are not locked together with the roller carrier 24, the ratio of outer wheel tangential distance b" to inner wheel tangential distance a" will likely not translate to the approximately 1:2 ratio previously discussed.

Figure 16A:
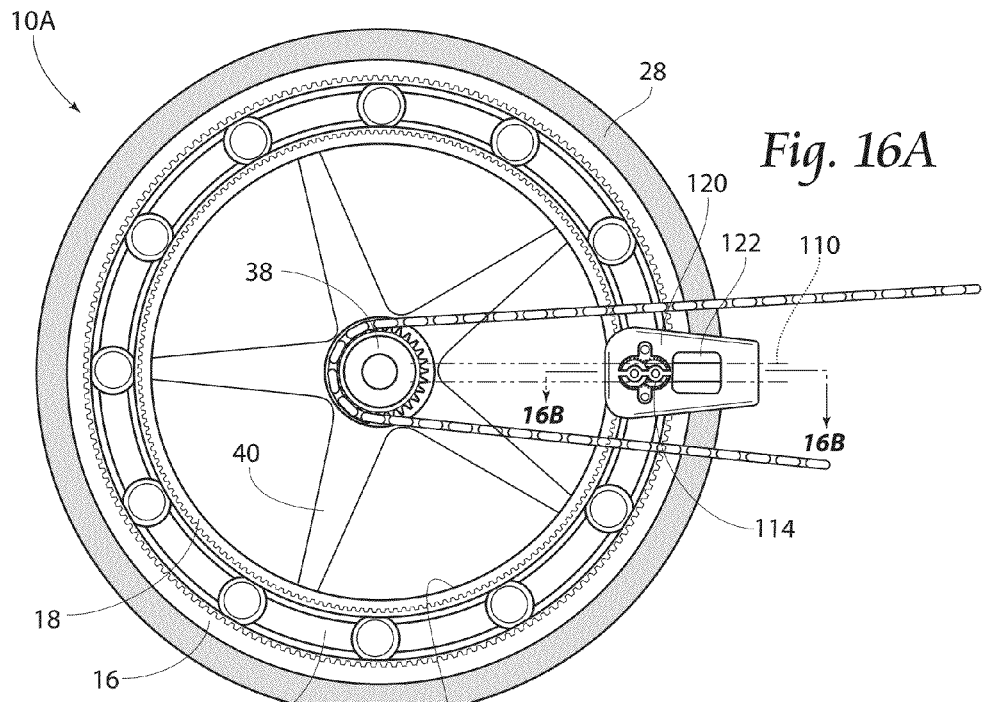
FIG. 16A is a view similar to that of FIG. 2, but showing another embodiment of a low efficiency system according to the present invention.
Figure 16B:
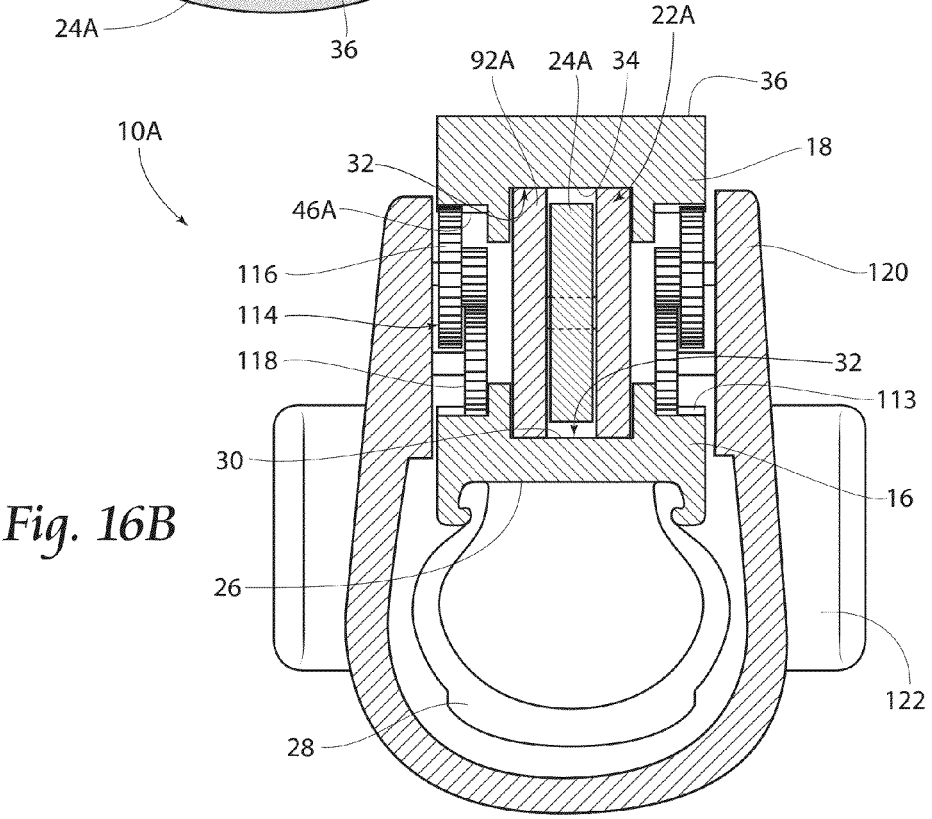
FIG. 16B is a cross sectional view of the system illustrated in FIG. 16A and taken along lines 16B-16B thereof.

With attention now to FIGS. 16A and 16B, another low efficiency system 10A according to the present invention may be seen. As in the previously described embodiment, the system 10A enables a cyclist 14 (see FIG. 1) to pedal with high energy yet move slowly over the ground. As is shown, system 10A preferably includes an outer wheel 16, an inner wheel 18, and an efficiency reduction apparatus having at least one step gear assembly 114. The step gear assembly includes a drive step gear 116 and a transfer gear 118, at least one idler roller assembly 22A and at least roller carrier 24A. As illustrated, the step gear assembly 114 functions in a similar manner to that of the previously described reducing drive roller assembly 20, and is secured to the bicycle frame 110 by way of housing 120 and frame fastener 122. The outer wheel 16 includes an outer circumferential edge 26 which is adapted to engage a standard bicycle tire 28 for contact with the ground during use. The outer wheel 16 further includes an inner circumferential edge 30 having a raceway 32 formed therein and a pair of spaced apart geared shoulders 113.

Further seen in FIGS. 16A and 16B, the system 10A includes an inner wheel 18 having an outer circumferential surface 34 and an inner circumferential surface 36. As is illustrated, and similar to the embodiment discussed with regard to FIGS. 1-15, the inner wheel 18 includes a hub 38 having radially extending spokes 40 which terminate at, and are connected to, the inner circumferential surface 36. As was mentioned with regard to FIG. 4, the hub 38 may be adapted to receive a standard multi-speed hub and sprocket assembly 42 (not seen in these views). As may be further viewed, the outer circumferential surface 34 includes a raceway 32 and a pair of circumferential, laterally spaced, geared bearing tracks 46A. The step gear assembly 114 rides between the geared bearing tracks 46A and the geared shoulders 113. The idler roller assembly 22A rides in the raceway 32. As in the previous embodiment, the idler roller assembly 22A in these views is not restrained by an assembly cage or other housing, rather the idler roller assembly 22A moves within raceway 32 and supported by roller carrier 24A. The idler roller assembly 22A serves to maintain uniform spacing between the outer wheel 16 and the inner wheel 18 during use. As viewed, the idler roller assemblies 22A each preferably include a pair of passive idler rollers 92A of a similar design to that of the previously described transfer roller 52. The effect is a result similar to that shown in FIG. 9 in which the ratio of the outer wheel 16 tangential distance (b) to the inner wheel 18 tangential distance (a) is greatly reduced.

Figure 17A:
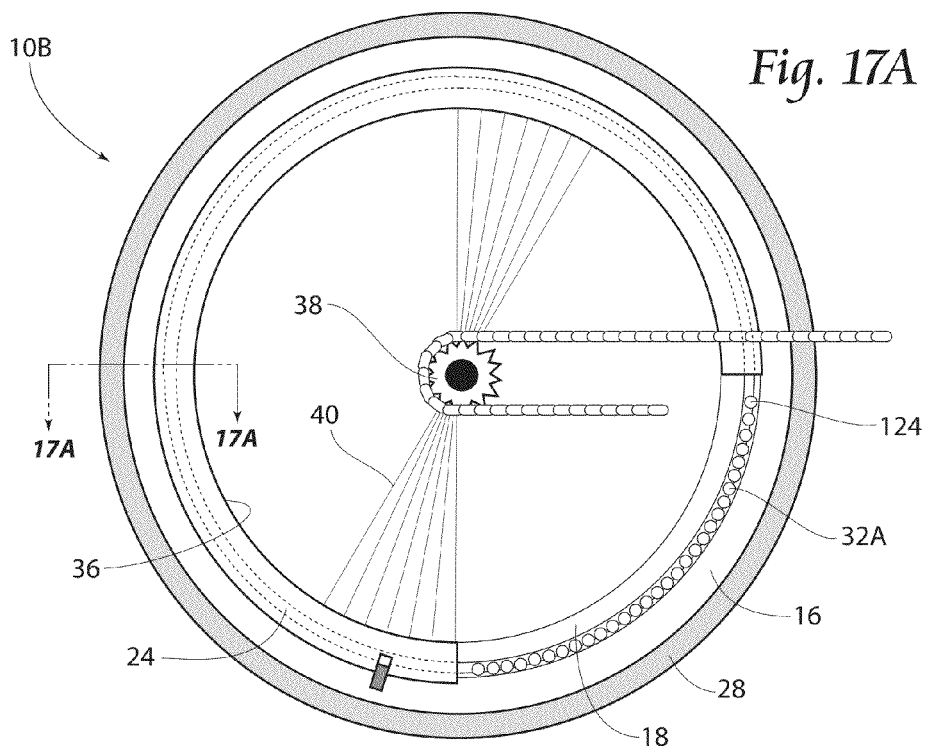
FIG. 17A is a view similar to that of FIGS. 2 and 16A, and showing another embodiment of a low efficiency system according to the present invention.
Figure 17B:
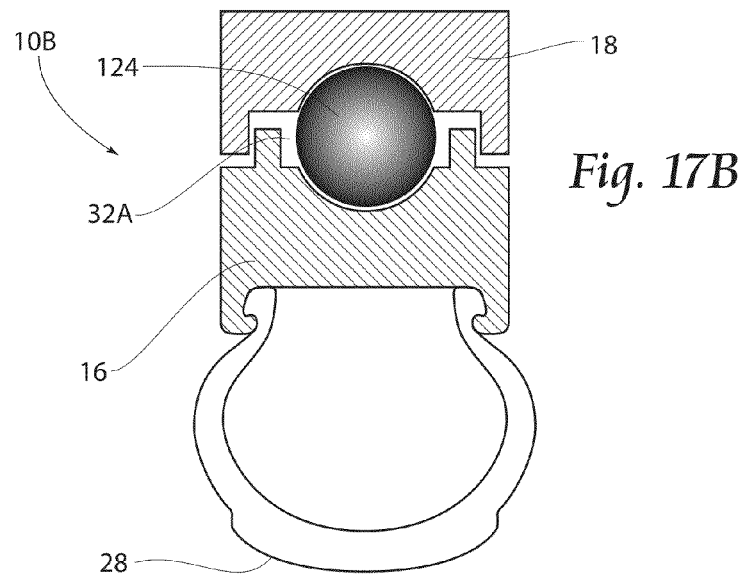
FIG. 17B is a cross sectional view of the system illustrated in FIG. 17A and taken along lines 17B-17B thereof.

Turning now to FIGS. 17A and 17B another drive reducing system 10B may be seen. Similarly to the systems 10, 10A previously described, the system 10B includes an inner wheel 18 having an outer circumferential surface 34, an inner circumferential surface 36, and a hub 38 having radially extending spokes 40 which terminate at, and are connected to, the inner circumferential surface 36. As was mentioned with regard to FIG. 4, the hub 38 may be adapted to receive a standard multi-speed hub and sprocket assembly 42 (not seen in these views). As is shown, an efficiency reduction apparatus including a raceway 32A may be located between the outer wheel 16 and the inner wheel 18. The raceway 32A preferably includes at least one ball bearing 124. In this embodiment, slippage occurs between the inner wheel 18 and the outer wheel 16 when the inner wheel 18 is rotated, due to bearings 124 located in the raceway 32A. The slippage reduces the efficiency of the outer wheel 16, and the outer wheel 16 moves at a greatly reduced efficiency as compared to the inner wheel 18. This inefficiency allows the cyclist 14 (not shown in these views) to pedal rapidly while moving the bicycle 12 slowly over the ground. The effect, although not identical to that shown in FIG. 9, is similar as the ratio of the outer wheel 16 tangential distance (b) to the inner wheel 18 tangential distance (a) is greatly reduced.

Figure 18A:
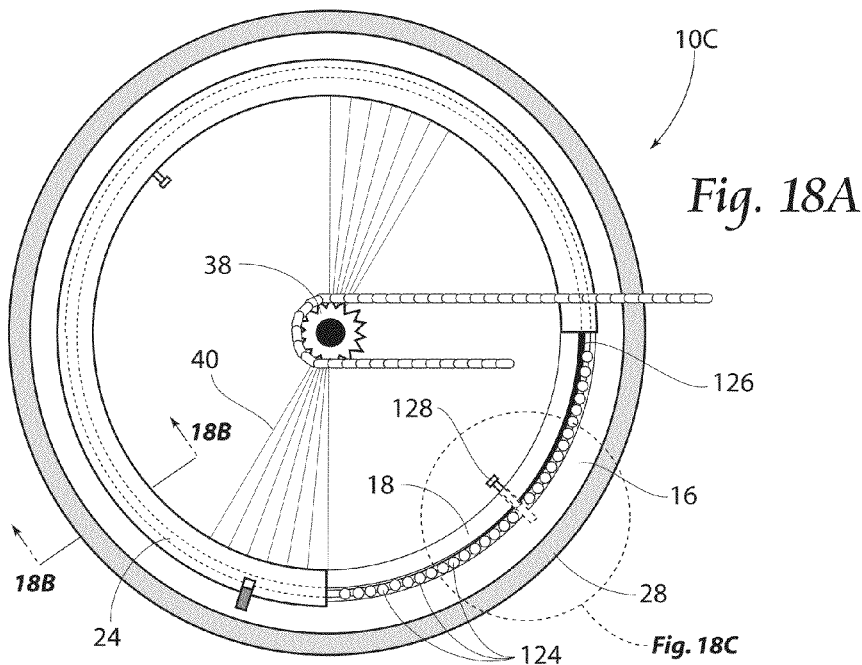
FIG. 18A is a view similar to that of FIGS. 2, 16A and 17A, but showing another embodiment of a low efficiency system according to the present invention.
Figure 18B:
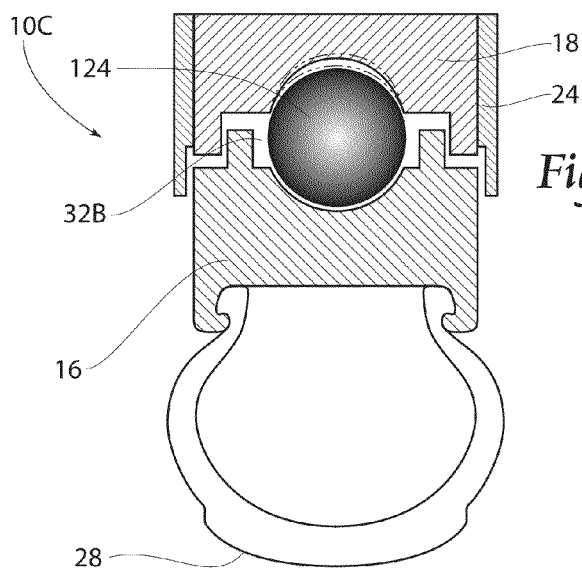
FIG. 18B is a cross sectional view of the system illustrated in FIG. 18A and taken along lines 18B-18B thereof.
Figure 18C:
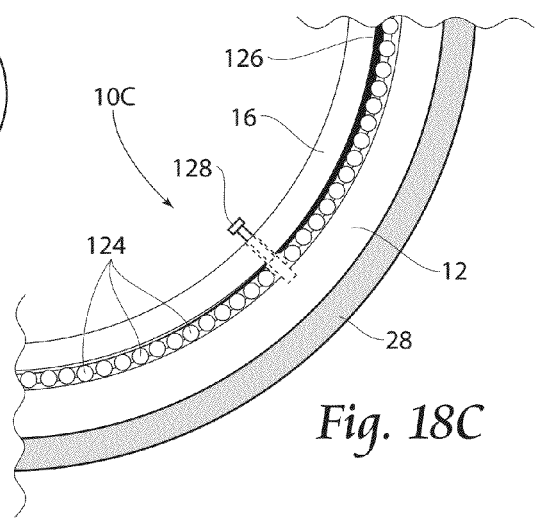
FIG. 18C is an enlarged fragmentary view of the area shown in FIG. 18A as 18C.

FIGS. 18A-18C illustrate another drive reducing system 10C according to the present invention. As in the embodiment described with regard to FIGS. 17A and 17B, the system 10C includes an inner wheel 18 having an outer circumferential surface 34, an inner circumferential surface 36, and a hub 38 having radially extending spokes 40 which terminate at, and are connected to, the inner circumferential surface 36. As was mentioned with regard to FIG. 4, the hub 38 may be adapted to receive a standard multi-speed hub and sprocket assembly 42 (not seen in this view). As is shown, an efficiency reduction apparatus having a raceway 32B may be located between the outer wheel 16 and the inner wheel 18. The raceway 32B preferably includes at least one bearing 124. In these views, the raceway 32B further includes areas of restriction 126 to induce subtle rotational force transfer from the inner wheel 18 to the outer wheel 16. Further viewed in FIG. 18A is a locking peg 128. The locking peg 128 may be manipulated between locked and unlocked positions to thereby lock or unlock the inner wheel 18 to the outer wheel 16. The locking peg 128 thereby enables a user having a bicycle 12 (not seen in these views) equipped with a system 10C to ride the bicycle 12 in both a typical manner when the inner and outer wheels 18, 16 are locked together, and in a reduced efficiency manner when the inner and outer wheels 18, 16 are not locked together. While a sole locking peg 128 is illustrated in the view of FIG. 18A, it is to be understood that it is within the scope of the invention to employ any number of locking pegs 128. Further, it is within the scope of the invention to provide any of the disclosed embodiments with at least one locking peg 128, if desired.

Figure 19A:
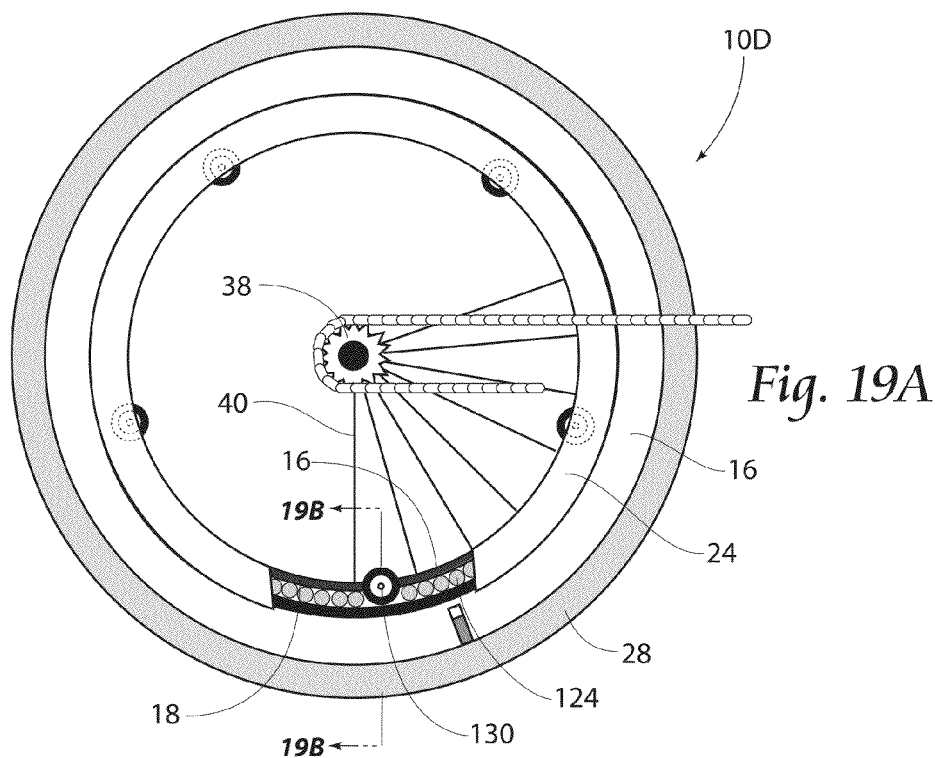
FIG. 19A is a view similar to that of FIGS. 2, 16A, 17A and 18A, but showing another embodiment of a low efficiency system according to the present invention.
Figure 19B:
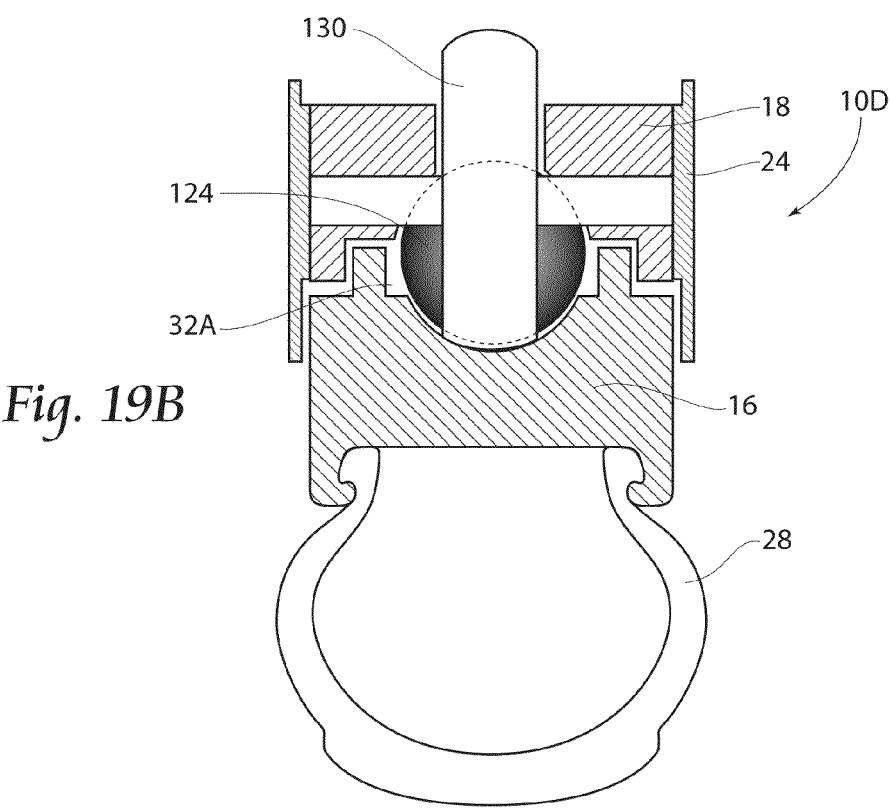
FIG. 19B is a cross sectional view of the system illustrated in FIG. 19A and taken along lines 19B-19B thereof.
Figure 22A:
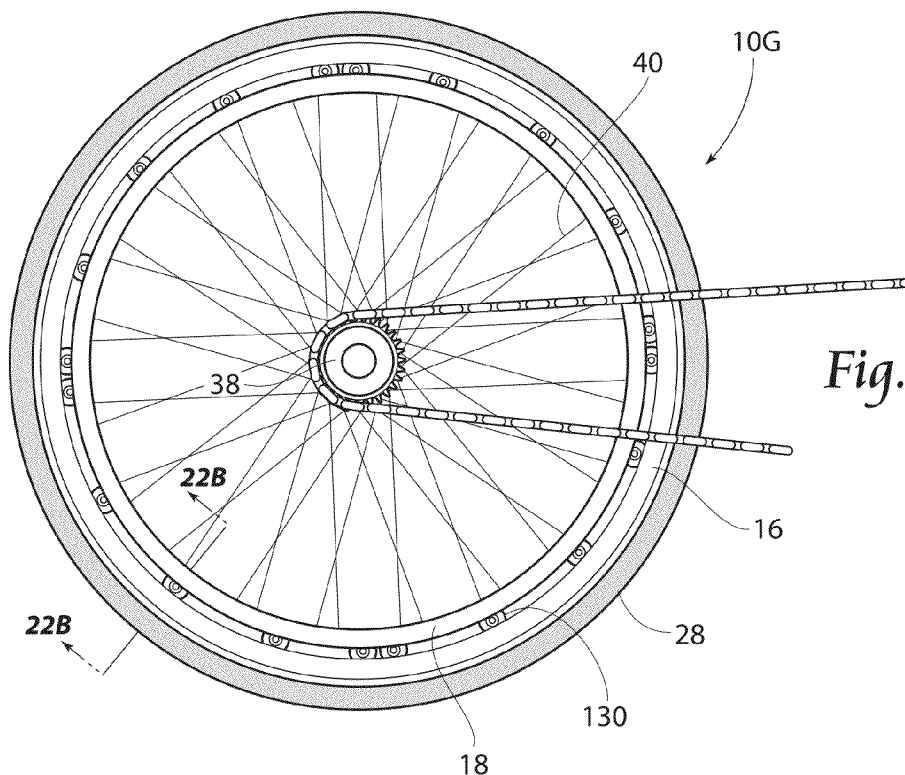
FIG. 22A is a view similar to that of FIGS. 2, 16A, 17A 18A, and 19A, but showing another embodiment of a low efficiency system according to the present invention.
Figure 22B:
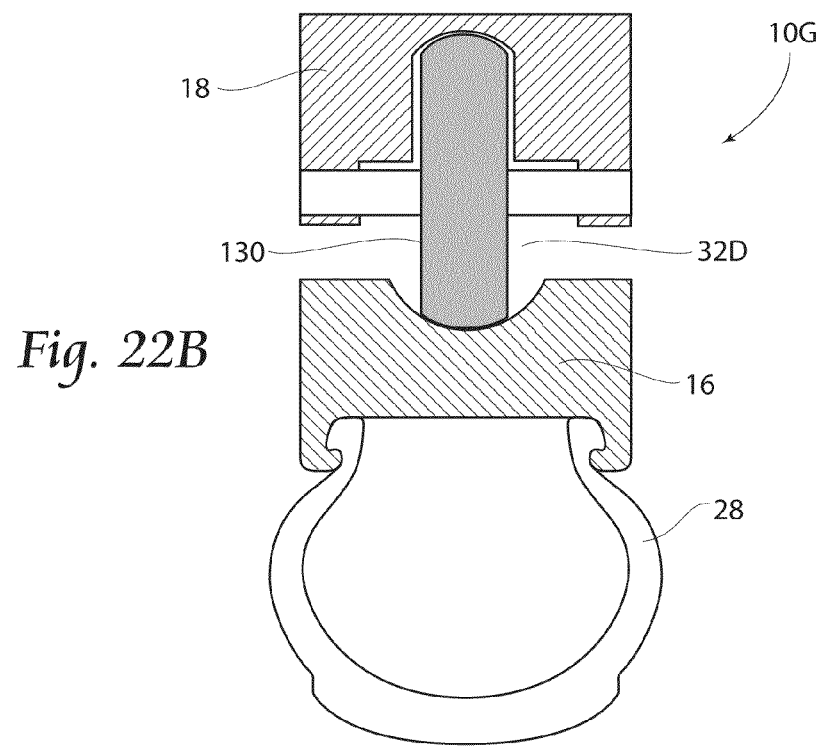
FIG. 22B is a cross sectional view of the system illustrated in FIG. 22A and taken along lines 22B-22B thereof.

FIGS. 19A and 19B illustrate another drive reducing system 10D having an efficiency reduction apparatus according to the present invention. In these views, the raceway 32A, in addition to roller bearings 124, further includes at least one idler roller 130. The idler rollers 130 transfer rotational force from the inner wheel 18 to the outer wheel 16 and further provide spacing between the inner and outer wheels 18, 16. Although the drawings illustrate the idler rollers 130 as being connected to the inner wheel 18, it is to be understood that it is within the scope of the present invention to place the idler rollers 130 on the outer wheel 16. Furthermore, the system 10D may include other features, such as the areas of restriction 126 illustrated in FIGS. 18A-18C. Alternatively, the system 10D may include only idler rollers 130 without the use of bearings 124, as is illustrated in the views of FIGS. 22A and 22B. Idler rollers 130 for use with the present invention may be fabricated from material having hardness necessary to both support the inner wheel 18 and to provide slippage. Materials contemplated include steel, rubber and the like, and it is to be understood that the present invention may include idler rollers 130 of various hardness within the same system.

Figure 20A:
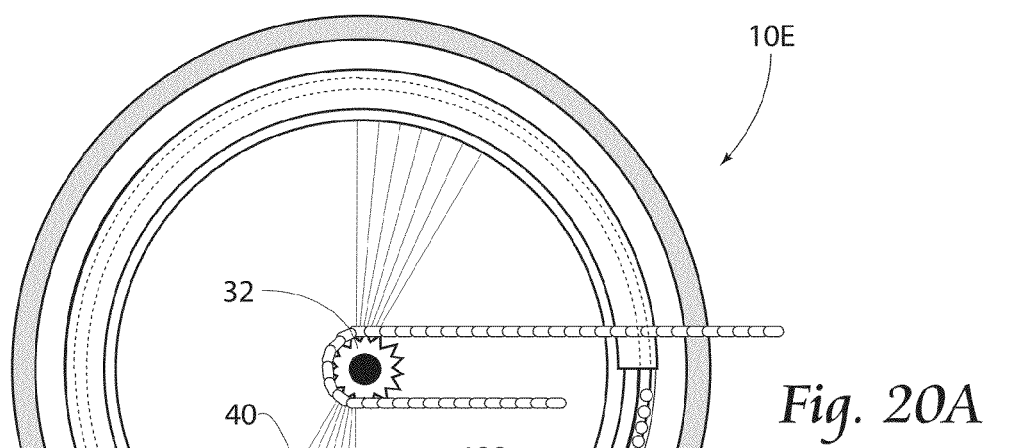
FIG. 20A is a view similar to that of FIGS. 2, 16A, 17A 18A, and 19A, but showing another embodiment of a low efficiency system according to the present invention.
Figure 20B:
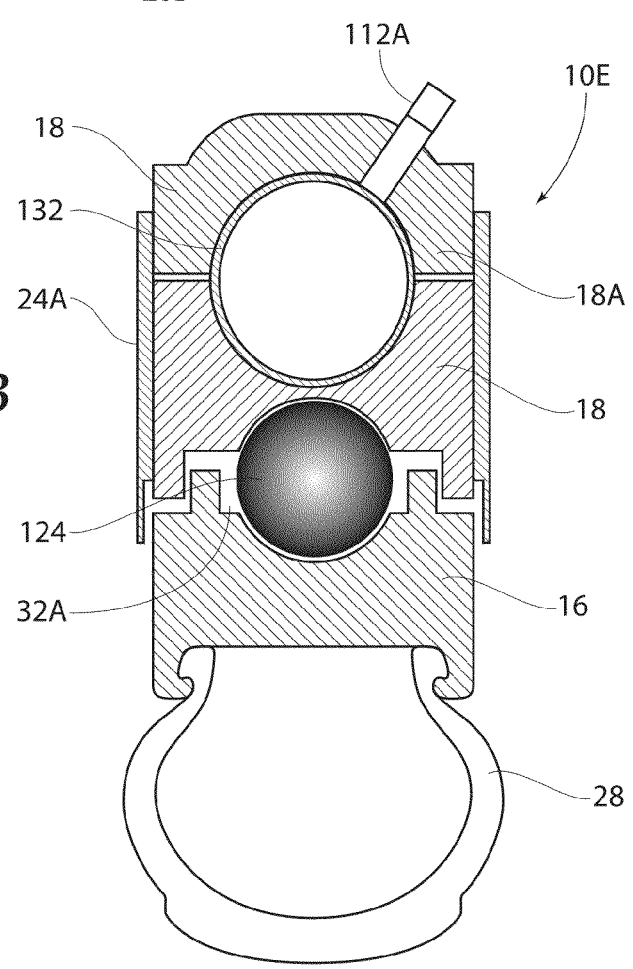
FIG. 20B is a cross sectional view of the system illustrated in FIG. 20A and taken along lines 20B-20B thereof.

FIGS. 20A and 20B illustrate another drive reducing system 10E according to the present invention. In these views, the raceway 132 includes both roller bearings 124 and an inflatable bladder member 132. The bladder member 132 subtly transfers rotational force from the inner wheel 18A to the outer wheel 16. The bladder member 132 may be used to increase or decrease the force on the raceway 32A, depending on the wishes of the cyclist. If greater force is desired, the cyclist uses the inflator 112A to increase air pressure in the bladder member 132. When force is increased on the raceway 32A, the bearings 124 are less easily moved, and thus more force is transferred from the inner wheel 18 to the outer wheel 16. Although the Figures illustrate the use of a bladder member 132 in conjunction with bearings 124, it is contemplated that a bladder member 132 may be provided in a system having the idler rollers 130 shown in FIGS. 19A, 19B, or even a system having both bearings 124 and idler rollers 130 as shown in FIGS. 19A and 18B, without departing from the spirit of the invention.

Figure 21A:
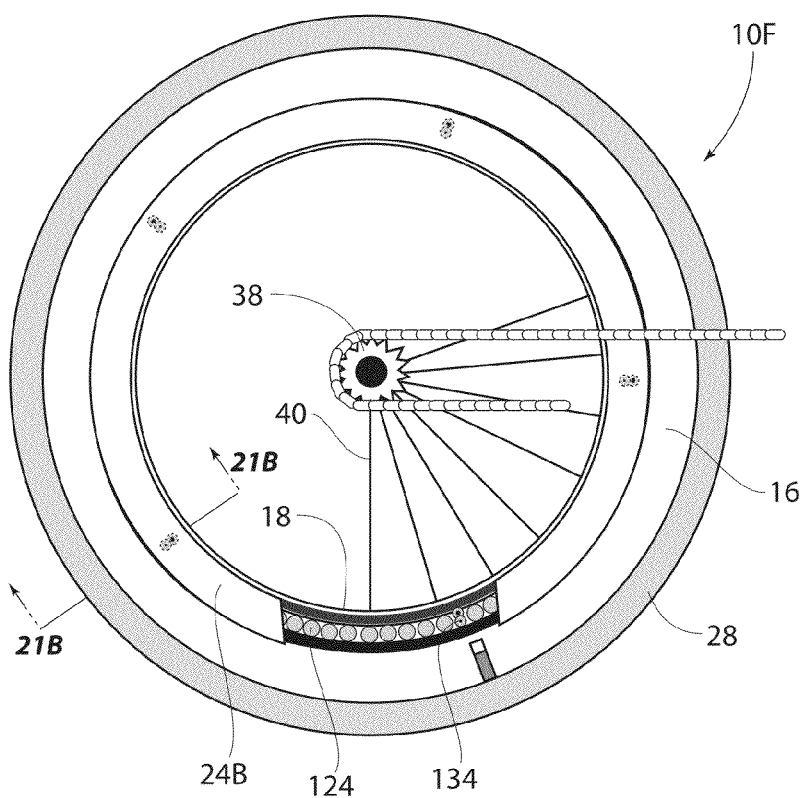
FIG. 21A is a view similar to that of FIGS. 2, 16A, 17A 18A, and 19A, but showing another embodiment of a low efficiency system according to the present invention.
Figure 21B:
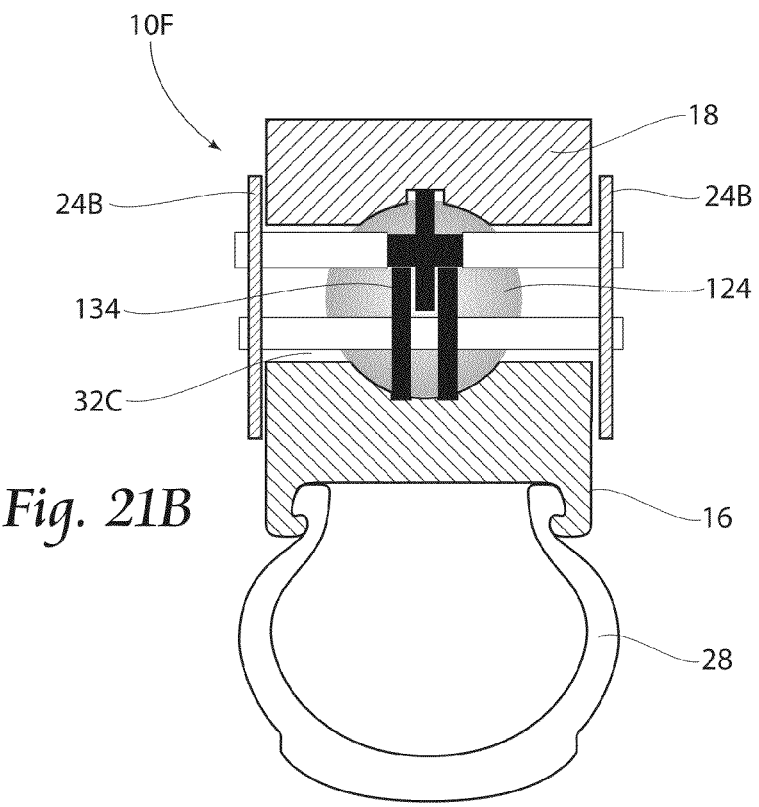
FIG. 21B is a cross sectional view of the system illustrated in FIG. 21A and taken along lines 21B-21B thereof.

FIGS. 21A and 21B illustrate another drive reducing system 10F according to the present invention. In these views, the raceway 32C includes a combination idler roller and gear system 134. As shown, the system 134 is located in the raceway 32C, with the raceway 32C being connected to a concentric bearing carrier 24B. As in previous embodiments, rotational force from the inner wheel 16 to the outer wheel 12 is subtly transferred. The idler roller and gear system 32 may be used to increase or decrease the force on the raceway 22, depending on the wishes of the cyclist.

FIGS. 22A and 22B illustrate another embodiment of a reduced efficiency wheel system 10G. In these views, the raceway 32D includes at least one idler roller 130, but does not include the bearings 124 shown in previous views. As in other embodiments including idler rollers 130, the idler rollers 130 transfer rotational force from the inner wheel 18 to the outer wheel 16 to thereby reduce the efficiency of the outer wheel 16 as compared to the inner wheel 18.

While the features of bearings 124, idler rollers 130, and bladder member 132 have been illustrated in the various system and efficiency reduction apparatus combinations of FIGS. 17A-22B, it is to be understood that other combinations of the described features may be envisioned and are considered to be within the scope of the present invention.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A low efficiency wheel system including:
    an inner wheel, said inner wheel having an inner circumferential surface and an outer circumferential surface, wherein said inner wheel is a driven wheel;
    an outer wheel, said outer wheel having an inner circumferential edge and an outer circumferential edge, wherein said inner circumferential edge is circumferentially adjacent to said outer circumferential surface of said inner wheel; and
    an efficiency reduction apparatus located between said outer circumferential surface of said inner wheel and said inner circumferential edge of said outer wheel.

2. The system of claim 1 wherein said efficiency reduction apparatus includes at least one reducing drive roller assembly, at least one idler roller assembly and at least one roller carrier.

3. The system of claim 2 wherein said at least one reducing drive roller assembly includes at least one transfer roller and at least one reducing drive roller.

4. The system of claim 3 wherein said at least one reducing drive roller includes a central cylinder member having a first diameter and a pair of axially spaced apart circular bearing members having a second diameter.

5. The system of claim 4 wherein said second diameter is larger than said first diameter.

6. The system of claim 5 wherein said inner circumferential edge includes a raceway formed therein.

7. The system of claim 6 wherein said outer circumferential surface includes a pair of circumferential, laterally spaced bearing tracks having an upraised central portion there between.

8. The system of claim 7 wherein said pair of axially spaced apart circular bearing members are arranged for bearing contact with said bearing tracks.

9. The system of claim 8 wherein said at least one transfer roller is arranged for rolling engagement with said raceway.

10. The system of claim 1 wherein said efficiency reduction apparatus includes least one step gear assembly.

11. The system of claim 1 wherein said efficiency reduction apparatus includes a raceway located between the outer wheel and the inner wheel, and wherein said raceway includes at least one ball bearing.

12. The system of claim 11 wherein said raceway includes areas of restriction.

13. The system of claim 11 wherein said efficiency reduction apparatus includes least one inflatable bladder member.

14. A method of reducing wheel efficiency including the steps of:
    providing an inner wheel, said inner wheel having an inner circumferential surface and an outer circumferential surface, wherein said inner wheel is a driven wheel;
    providing an outer wheel, said outer wheel having an inner circumferential edge and an outer circumferential edge, wherein said inner circumferential edge is circumferentially adjacent said outer circumferential surface of said inner wheel; and
    providing an efficiency reduction apparatus located between said outer circumferential surface of said inner wheel and said inner circumferential edge of said outer wheel.

15. The method of claim 14 including the further steps of:
    moving said inner wheel a first tangential distance;
    inputting said first tangential distance from said inner wheel to said efficiency reduction apparatus;
    outputting a second tangential distance from said efficiency reduction apparatus to said outer wheel; and
    moving said outer wheel the second tangential distance, wherein said second tangential distance is less than said first tangential distance.

* * * * *